United States Patent [19]

Koskinen

[11] Patent Number: 5,586,771
[45] Date of Patent: Dec. 24, 1996

[54] SLIDING SEAL WITH HOLE AND GROOVE FOR DISTRIBUTION OF PRESSURIZED FRICTION REDUCING MEDIUM

[76] Inventor: Pertti Koskinen, Paasikiventie 8 B 9, FIN-33230 Tampere, Finland

[21] Appl. No.: 433,349

[22] PCT Filed: Sep. 12, 1994

[86] PCT No.: PCT/FI94/00397

§ 371 Date: May 4, 1995

§ 102(e) Date: May 4, 1995

[87] PCT Pub. No.: WO95/07423

PCT Pub. Date: Mar. 16, 1995

[30] Foreign Application Priority Data

Sep. 10, 1993 [FI] Finland ................... U930453

[51] Int. Cl.⁶ ........................................ F16J 15/46
[52] U.S. Cl. .................... 277/34; 277/74; 33/705
[58] Field of Search ................ 277/12, 34, 34.3, 277/34.6, 74–76, 201, 202, 226, 237 R, DIG. 7, DIG. 8; 33/705, 501.02, 503; 49/477.1, 498.1

[56] References Cited

U.S. PATENT DOCUMENTS

| 2,859,987 | 11/1958 | Emley, Jr. ............... 49/477.1 |
|---|---|---|
| 3,815,926 | 6/1974 | Vore ............................ 277/34 |
| 4,230,324 | 10/1980 | Derman ........................ 277/75 |
| 4,376,543 | 3/1983 | Sakagami ................ 277/237 R |
| 4,377,036 | 3/1983 | Dangschat ................... 33/705 |
| 4,462,619 | 7/1984 | Hotger . | |
| 4,600,203 | 7/1986 | Miller et al. ............ 277/237 R |
| 4,632,722 | 12/1986 | Pankoke .................. 277/DIG. 7 |
| 5,076,108 | 12/1991 | Trimarchi ..................... 277/34 |

FOREIGN PATENT DOCUMENTS

| 245034 | 4/1987 | German Dem. Rep. ............ 33/705 |
|---|---|---|
| 2254383 | 5/1973 | Germany . | |
| 3030540 | 4/1983 | Germany . | |
| 863245 | 3/1961 | United Kingdom ............... 277/34 |

*Primary Examiner*—Scott Cummings
*Attorney, Agent, or Firm*—Larson and Taylor

[57] ABSTRACT

An arrangement to seal an element (1), moving in respect to an oblong slit, and to reduce friction, in which slit there is as a slealing at least one medium pressurized tubular sealing (4) characterized in that in the element (1), which moves in respect to the slit there is a part (6) tapering off towards its ends and the side of which is furnished with a hole (7) for feeding pressurized medium, for instance air, to the sliding face between the sealing (4) and the part (6), and that there is on the side of the part, at least at a certain distance of the said sliding face, a groove (8) along which pressurized medium can be fed.

8 Claims, 2 Drawing Sheets

SLIDING SEAL WITH HOLE AND GROOVE FOR DISTRIBUTION OF PRESSURIZED FRICTION REDUCING MEDIUM

BACKGROUND OF THE INVENTION

1. Field of the Invention

This invention relates to an arrangement for providing sealing of an element movable in an oblong or elongate slit.

2. The Prior Art

Previously known seals for elongate slits include rubber tubes shaped for this purpose. Such slits can be inaccurate, i.e., out of tolerance, and their form or shape can change or vary over the length thereof. One or several tubular seals have been installed in a slit or arranged in pairs on both sides of the slit. When tubular seals are made airtight and provided with the possibility to supply air pressure or retain pressure in the tube, a seal is produced that yields and allows significant play between the parts that have to be sealed. At a proper moment, air under pressure is fed to the seal, for instance when a door, which must be shut, has been closed, such that the pressure in the tubular seal does not hinder the closing of the door.

SUMMARY OF THE INVENTION

In the solution this invention tubular seals are, in a new way, adapted to the sealing function of the element that is moved in or moves in respect to the slit as well as to the sealing function of the slit, whereby the special requirements of the moving element have been taken into account, in order to maintain tightness and reduce friction and wear.

The most important advantages of the invention include the features that the movable element in the slit can be made reliably sealed, partly due to reduced friction, such that the tubular sealings do not wrinkle or otherwise deform due to the sliding forces between themselves and the moving element, and that the reliability is further increased by the notable decrease of wear of the sealing tubes thanks to lubrication by the air that is supplied. This air or other pressurized flow to the sealing face also keeps the sealing face free from dirt. Pressure fed to the sealing face with possible lubrication medium contained therein, ensures the start of the element without damaging the seal even in a case where there has been quite a long break of operation in between. The pressure is then allowed to affect the sealing face before the element is set into motion.

BRIEF DESCRIPTION OF THE DRAWINGS

In the following the invention is presented in detail with reference to the enclosed drawing, where.

Figure 1:
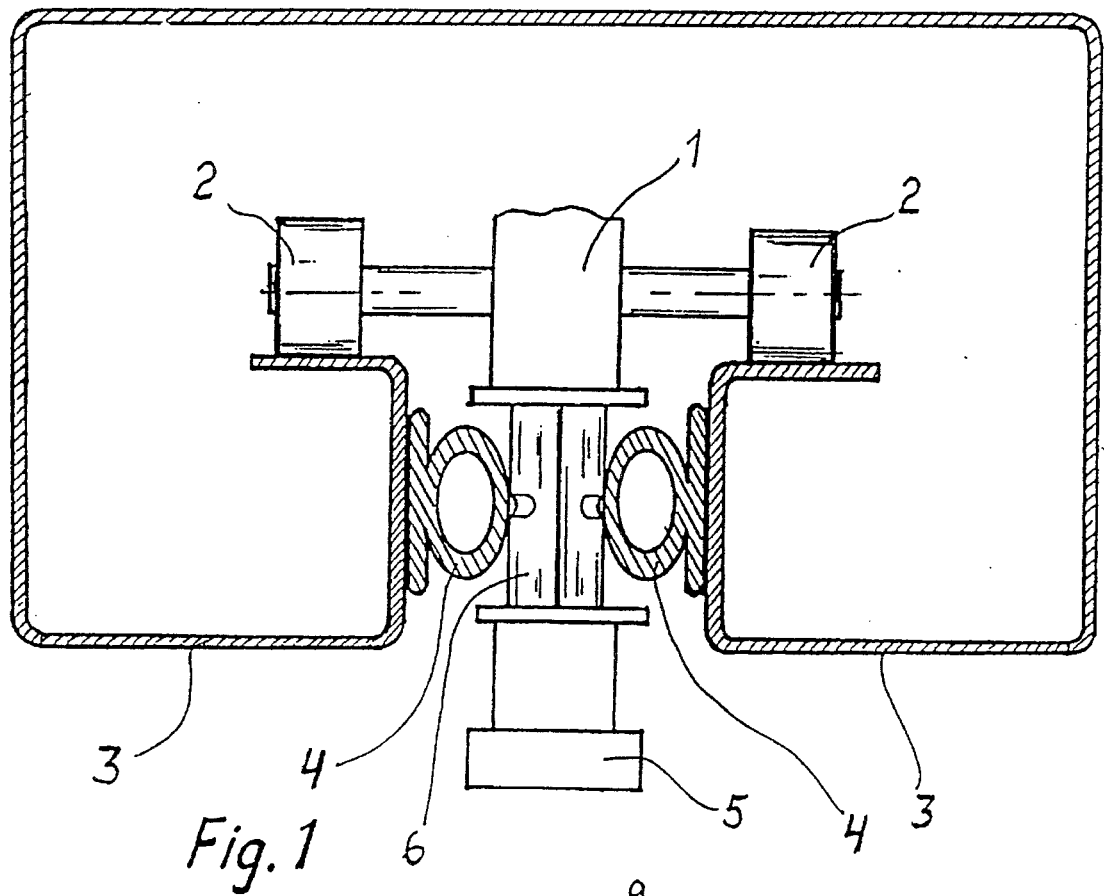
FIG. 1 is an element in a slit that has to be sealed, viewed from the end.

DESCRIPTION OF A PREFERRED EMBODIMENT;

FIG. 1 shows the end view of a slit that must be sealed and is formed in a tubular profile beam 3. In the beam a mechanism, only a part of which is shown in the figure, is arranged to move element 1 in the tubular beam direction, i.e., parallel to the longitudinal axis of beam 3. In both edges of the slit, tubular rubber sealings or sealing tube 4 are glued, the profile of 4 which comprises a planelike or planar section for gumming or otherwise affixing to beam 3 and the actual tubular part. The slit is sealed by tubular rubber sealings when air for pressurizing the tubes 4 is fed into tubes 4. The tube sides touch each other and close the slit.

The sectional view in FIG. 1 shows the location of element 1. The element 1 is supported on the beam edges by rollers 2 travelling along the edges. At the sealing tubes 4 the element, has a portion or part 6 tapering off towards its ends and a measuring sensor 5. Thus, the measuring sensor 5 can, as a movable part, be taken to a space or area of different climate or conditions by means of the said slit sealing. Measuring device 5, or any other instrument used in place thereof is placed in hard and difficult conditions, for instance for crosswise measuring of web in a paper machine. By means of slight over-pressure, a normal condition or climate can be produced inside the profile beam 3 thanks to the sealing function.

Figure 2:
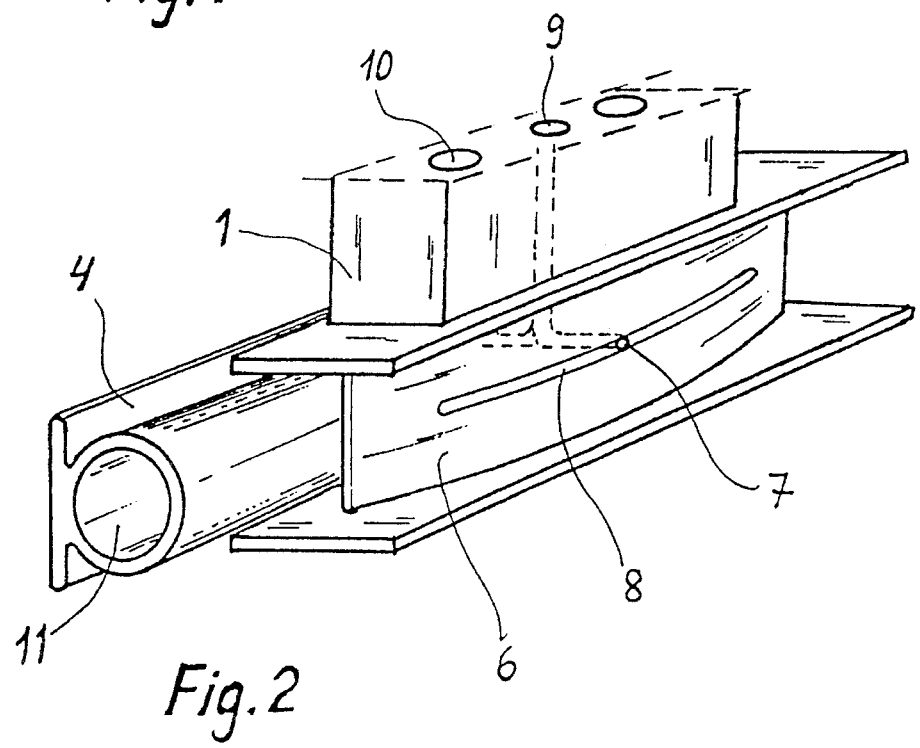
FIG. 2 is a perspective view of an element moving in a slit.

FIG. 2 shows a perspective view of element 1. Part 6, which tapers off towards its ends, is in sliding contact with sealing tubes 4. Thanks to tapering, the sealing tubes adjust well to the surface of part 6 and neither does the part tend to damage the tubes. On the sliding surface of part 6 there is a groove 8 into which air is fed through a hole 7 along canalization or channel 9. A slight air leak from groove 8 and the pressure impact on the side of tube 4 reduce friction, substantially, in the sliding surface and, accordingly, also reduce wear of tube 4. The air can contain lubrication oil or other medium. In addition to air, pressurized gases or liquids can also be fed to groove 8, depending upon need. The flow of these mediums on the sealing surface keeps also the surface clean. The pressurized gas fed to the groove 8 can be same gas, by means of which overpressure is maintained on either side of the sealing face. By means of the solution provided by the invention measuring devices or similar sensing devices, sampling collectors, feed nozzles or tools can be taken through the sealing face into any other condition, where the climate can be, for instance, dirty, corrosive or toxic. Moreover, the conveying devices of the element 1 are in a clean environment or climate, for instance inside the profile beam, thereby securing the travel function i.e., ensuring the movement of the element 1 is unimpeded by environmental influences.

Figure 3:
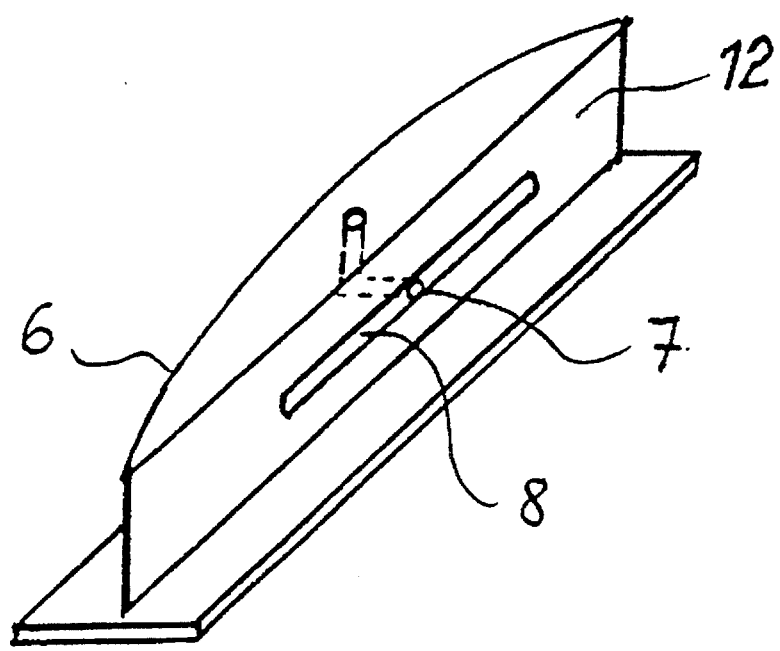
FIG. 3 is a perspective view of an alternative embodiment of the element shown in FIGS. 1 and 2.

The invention is not restricted to the enclosed embodiment but modifications are possible within the inventive concept as determined by the enclosed patent claims. The solution according to the invention can be adapted utilizing one tubular sealing 4, whereby one side of part 6 is curved, as shown in FIG. 2, and the other side is straight. This embodiment is illustrated in FIG. 3. In application, the curved side 6 is disposed against the tubular sealing 4 and the straight side is against the sliding face formed in the other edge of the slit. The straight side 12 is also furnished with a hole 7 and a groove 8 as in FIG. 2.

In an alternative a tube beam 3 is used as the movable part while the element is kept immobile.

I claim:

1. An arrangement for sealing an element which is relatively moveable with respect to an elongate slit, and for reducing friction at a sliding interface between said element and a seal for said slit, said seal comprising at least one pressurized tubular sealing member and said element including a tapering part tapering down towards the ends thereof, one side of said tapering part including a hole for feeding a pressurized medium to the sliding interface between the seal and said part, and at least a portion of said part of said element including an elongate groove in communication with said hole and along which said pressurized medium supplied through said hole is fed.

2. An arrangement according to claim 1 wherein the slit to be sealed is formed in a positively pressurized beam extending parallel to said slit.

3. An arrangement according to claim 1 wherein the slit to be sealed is formed in a beam under negative pressure and extending parallel to said slit.

4. An arrangement according to claim 1 wherein said slit is formed in a beam defining a pressurized clean space, and an instrument disposed outside of said clean space is moved by means of a portion of said element that extends through said slit.

5. An arrangement according to claim 1 wherein one side of said tapering part is flat.

6. An arrangement according to claim 1 wherein a lubricant is fed to said groove to lubricate said sliding interface.

7. An arrangement according to claim 1 wherein the slit to be sealed is movable and said element is immobile.

8. An arrangement according to claim 1 wherein said pressurized medium comprises air under pressure.

* * * * *